United States Patent
Pregont

[11] Patent Number: 5,812,956
[45] Date of Patent: Sep. 22, 1998

[54] CLUSTERED ANTENNAS IN A CELLULAR COMMUNICATION SYSTEM AND METHOD OF DEPLOYING THE SAME

[75] Inventor: Gary J. Pregont, Dundee, Ill.

[73] Assignee: Motorola, Inc., Schaumburg, Ill.

[21] Appl. No.: 701,294

[22] Filed: Aug. 22, 1996

[51] Int. Cl.$^6$ .............................. H04Q 7/36; H04M 1/00
[52] U.S. Cl. ..................... 455/562; 455/562; 455/575; 379/433; 379/434
[58] Field of Search ..................... 455/447, 448, 455/446, 454, 561, 562, 524, 90, 449

[56] References Cited

U.S. PATENT DOCUMENTS

| | | | |
|---|---|---|---|
| 4,128,740 | 12/1978 | Graziano | 455/562 |
| 5,067,147 | 11/1991 | Lee . | |
| 5,175,867 | 12/1992 | Wejke et al. | 455/438 |
| 5,193,109 | 3/1993 | Lee . | |
| 5,303,240 | 4/1994 | Borras et al. | 455/562 |
| 5,307,507 | 4/1994 | Kanai | 455/562 |
| 5,491,723 | 2/1996 | Diepstraten | 455/562 |
| 5,537,682 | 7/1996 | Miller | 455/562 |
| 5,546,443 | 8/1996 | Raith | 455/449 |
| 5,586,167 | 12/1996 | Handforth | 455/562 |
| 5,603,083 | 2/1997 | Lee | 455/562 |
| 5,621,786 | 4/1997 | Fischer et al. | 455/504 |

OTHER PUBLICATIONS

Mikael Gudmundson, Cell Planning In Manhattan Environments, see p. 435, Jan. 1992.
Maciel et al., Cell Shape for Microcellular Systems in Residetial and Commercial Environments, May 1994.
Loew et al., Radio Propagation Into Buildings at 912, 1920, and 5990 MGZ using microcells, Jan. 1994.

*Primary Examiner*—Dwayne D. Bost
*Assistant Examiner*—Jean A. Gelin
*Attorney, Agent, or Firm*—Kenneth A. Haas

[57] ABSTRACT

Base site deployment in a cellular communication system takes place by positioning a base site antenna (102) mid block, with the main bore of the antenna (102) pointing parallel to the street (104) in which the antenna (102) is located (104). Additionally, the base site antenna (102) is located below the rooftop of any buildings (118) occupying the street (104). Multiple base site antennas (201–211) are formed into a cluster (214) existing in an N×N city block area such that the bore of each antenna (201–211) is positioned to point into the center of the cluster (214) and parallel to the street that it is located. Positioning base site antennas (201–211) in such a way will serve to channel, or canyon, the Radio Frequency propagation from the antennas (201–211) in a direction of the antenna's (201–211) main lobe (120) and back lobe (122), reducing cochannel and adjacent channel interference.

21 Claims, 3 Drawing Sheets

CLUSTERED ANTENNAS IN A CELLULAR COMMUNICATION SYSTEM AND METHOD OF DEPLOYING THE SAME

FIELD OF THE INVENTION

The present invention relates generally to base site deployment in a communication system and, in particular, to a method of microcellular base site deployment in a metropolitan environment.

BACKGROUND OF THE INVENTION

Communication systems are known to comprise a plurality of base sites that provide communication services to remote units located in corresponding service coverage areas of the base sites. One known communication system is a cellular communication system, such as the Global System for Mobile Communications (GSM). In the GSM system, a remote unit (i.e., a mobile or portable radiotelephone) that desires to communicate, sends a channel request signal to a base site serving the coverage area in which the remote unit resides. Upon receiving the channel request signal, the serving base site allocates a communication resource for the communication. The communication resource comprises a coordinated pair of time slots and frequencies (i.e., a first time slot at an uplink frequency and a second time slot at a downlink frequency). The time slot at the uplink frequency supports transmissions from the remote unit to the serving base site; whereas, the time slot at the downlink frequency supports transmissions from the serving base site to the remote unit.

Upon allocating the communication resource, the base site sends a channel designation signal to the remote unit via a common control channel. The channel designation signal contains the uplink time slot and frequency, the downlink time slot and frequency, and the transmit power for the remote unit. Upon receiving the channel designation signal, the remote unit tunes its transmitter and receiver to the designated time slots and frequencies and begins communicating with a telephone network subscriber or another remote unit via the serving base site.

During a typical communication, the remote unit moves throughout the coverage area of the serving base site and the serving base site monitors a signal quality metric (i.e., received signal strength indication (RSSI)) of the remote unit's uplink communication signal. To account for changes in RSSI as the remote unit moves, the serving base site will issue commands directing the remote unit to increase or decrease the remote unit's transmit power as the need arises.

Typically, as the remote unit moves to the periphery of the serving base site coverage area, the transmit power of the remote unit as well as the transmit power of the base site must be increased to account for an increase in path losses between the serving base site and the remote unit. This increased transmit power has the potential to interfere with an uplink/downlink communication signal at the same, or an adjacent, uplink/downlink frequency being used in another base site coverage area. That is, the higher power transmission of the remote unit and base site can increase the cochannel or adjacent channel interference in the other coverage area as viewed by the remote unit or base site serving that coverage area. Because metropolitan areas require base sites near each other (i.e., microcellular base sites within 200 meters), cochannel and adjacent channel interference can be a larger problem in urban settings, reducing the erlangs generated within the communication system.

Thus a need exists for microcellular base site deployment in a metropolitan environment that reduces cochannel and adjacent channel interference.

DETAILED DESCRIPTION OF THE DRAWINGS

Stated generally, base site deployment in a cellular communication system takes place by positioning a base site antenna mid block, with the main bore of the antenna pointing parallel to the street in which the antenna is located. Additionally, the base site antenna is located below the rooftop of buildings occupying the street. Multiple base site antennas are formed into a cluster occupying an N×N city block area such that the bore of each antenna is positioned to point into the center of the cluster and parallel to the street that it is located. Positioning base site antennas in such a way will serve to channel, or canyon, the Radio Frequency propagation from the antennas in a direction of the antenna's main lobe and back lobe, reducing cochannel and adjacent channel interference.

The present invention encompasses a cluster of antennas deployed in an urban setting with each antenna in the cluster mounted substantially mid-block and below rooftop level and existing on adjacent streets at a periphery of a city block area. Additionally, each antenna has its main bore pointing parallel to the street and into the cluster such that a canyoning effect is used to isolate each antenna within the cluster.

An alternate embodiment encompasses a communication system existing in an urban setting. The communication system includes a first group of antennas mounted substantially mid-block and below rooftop level and existing on adjacent streets at a periphery of a city block area, each antenna within the group of antennas further has its main bore pointing parallel to the street and into the cluster such that a canyoning effect is used to isolate each antenna within the cluster. Additionally, the communication system includes a second group of antennas mounted similar to the first group of antennas, with each antenna in the second group existing on an adjacent street at a periphery of a second city block area such that corresponding antennas from the first and the second cluster are not on the same street.

A final embodiment of the present invention encompasses a method of deploying clustered antennas in a communication system existing in an urban setting, the method comprising the step of mounting a plurality of antennas to form a cluster such that each antenna within the cluster is mounted substantially mid-block and below rooftop level and existing on adjacent streets at a periphery of a city block area. Each antenna has its main bore pointing parallel to a street and into the cluster such that a canyoning effect is used to isolate each antenna within the cluster.

Figure 1:
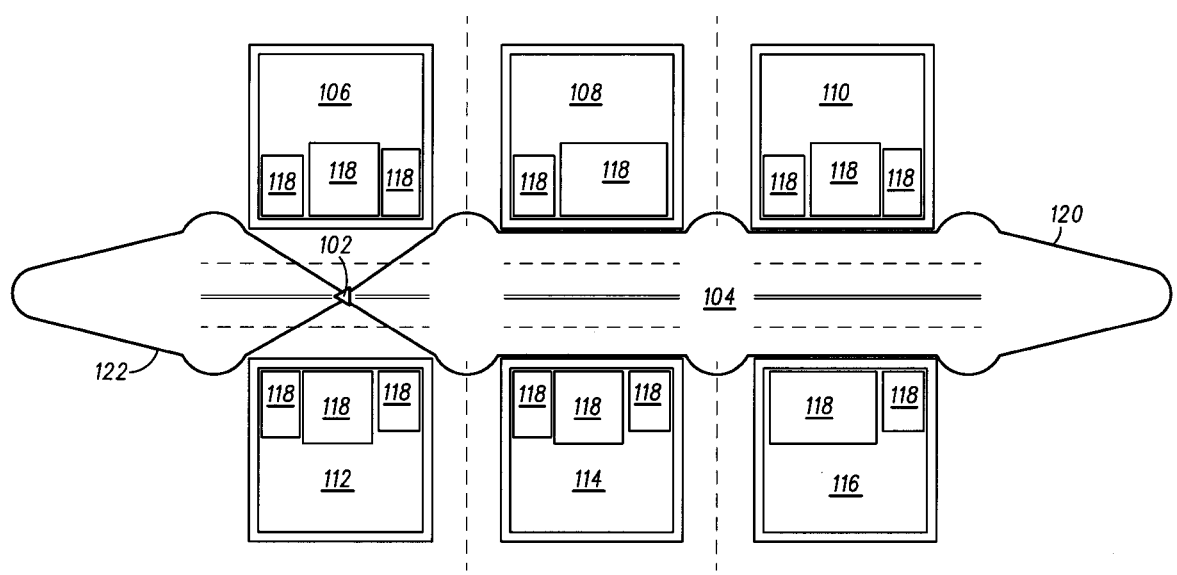
FIG. 1 illustrates a method of positioning a base site antenna in a metropolitan area in accordance with a preferred embodiment of the present invention.

FIG. 1 illustrates a method of positioning a base site antenna 102 in a metropolitan area in accordance with a preferred embodiment of the present invention. In a preferred embodiment of the present invention, base site antenna 102 comprises a directional antenna, but other antenna types (an omni directional antenna, for example) may be used. As shown, base site's directional antenna 102 is located mid-block, (for example, between block 106 and block 112) with the main bore of antenna 102 pointing parallel to street 104. In a preferred embodiment, 35 antenna 102 is located below the rooftop of buildings 118, which serves to channel, or canyon the Radio Frequency (RF) propagation from antenna 102 in the direction of antenna's 102 main lobe 120 and back lobe 122, with very little side-to-side dispersion. Canyoning antenna 102 isolates the corresponding base site, and reduces cochannel and adjacent channel interference for remote units not on street 104.

Figure 2:
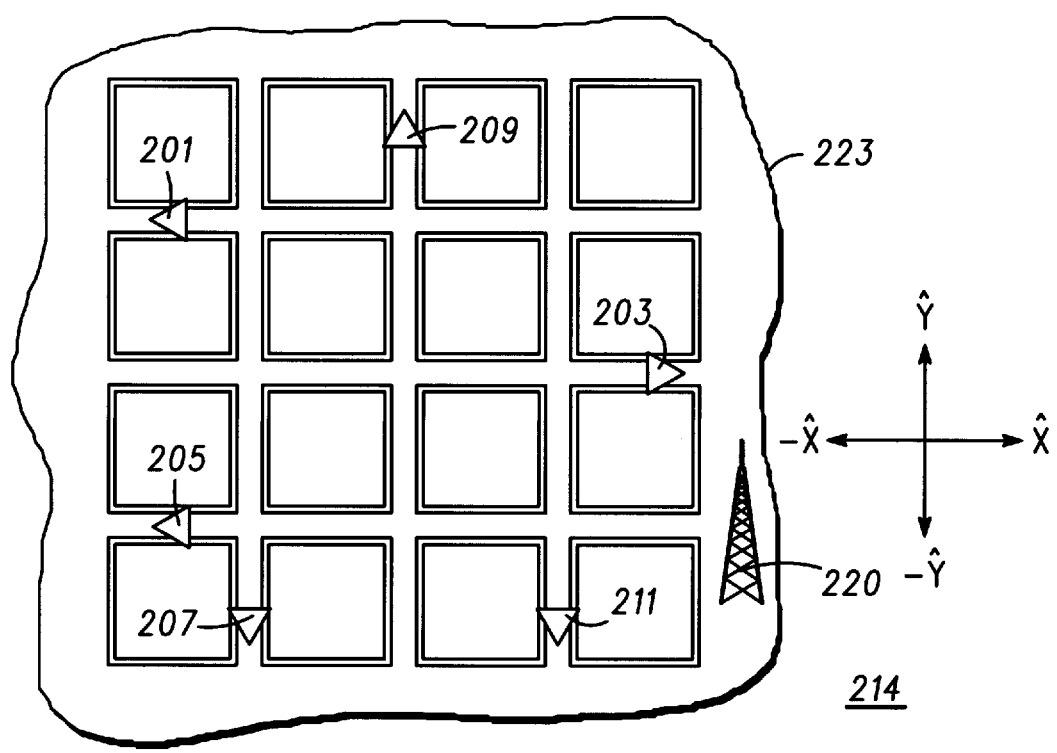
FIG. 2 illustrates a method of clustering base site antennas in a metropolitan area in accordance with an alternate embodiment of the present invention.

FIG. 2 illustrates a method of clustering micro cellular base site antennas 201–211 in a metropolitan area in accordance with an alternate embodiment of the present invention. Although the alternate embodiment is illustrated below with six base site antennas 201–211 occupying a 4×4 block area, although in other embodiments, any N×N block area having the appropriate number of base sites may utilize the present invention. As shown in FIG. 2, cluster 214 comprises six base site directional antennas 201–211 that are positioned as described in FIG. 1. Base site antennas are located on adjacent streets at the periphery of a 4×4 city block area. In a preferred embodiment, base site antennas 201 and 205 propagate in the X direction, base site antenna 203 propagates in the –X direction, base site antennas 207 and 211 propagate in the Y direction, and base site antenna 209 propagates in the –Y direction. Additionally, the main bore of each base site antenna 201–211 is positioned to point towards the center of cluster of base site antennas 201–211 and parallel to the street that it is located. Such an arrangement of base site antennas 201–211 serves to isolate each base site by placing the largest distance between base site antennas 201–211 while assuring that each street within the 4×4 block area is within the coverage area of a base site. Additionally, as described in FIG. 1, base site antennas 201–211 are further isolated from each other due to the canyon effect.

In a preferred embodiment of the present invention a frequency 30 reuse plan is also utilized for cluster 214 that further isolates base site antennas 201–211 from each other, as well as from any larger macrocellular base site (such as base site 220 having coverage area 223). In a preferred embodiment of the present invention, a subset of the macrocell spectrum is reserved for base site antennas 201–211. In order to further reduce cochannel and adjacent channel interference, macrocells that are geographic neighbors to base site antennas 201–211 are not allowed to use channels reserved for base site antennas 201–211. In order to avoid interference between base site antennas 201–211 at street intersections, the frequency reuse plan is arranged such that the channels for base site antennas 207–211 propagating in the Y/–Y direction are at one end of the microcell spectrum, and the channels for base site antennas 201–205 propagating in the X/–X direction are at the other end of the microcell spectrum. The number of channels to be reserved in such a system can be determined by the following equation:

Number of channels=Number of Cells Per Cluster*Number of Channels Per Cell.

Table 1 illustrates a frequency reuse plan for a system having four channels per cell and six cells per cluster.

TABLE 1

Frequency reuse plan for a Communication System Having Four Channels Per Cell and Six Cells Per Cluster.

| Base Site Antenna | |
|---|---|
| 201 | Channels 1, 4, 7, 10 |
| 205 | Channels 2, 5, 8, 11 |
| 207 | Channels 13, 16, 19, 22 |
| 211 | Channels 14, 17, 20, 23 |
| 203 | Channels 3, 6, 9, 12 |
| 209 | Channels 15, 18, 21, 24 |

Because of adjacent channel interference between antennas 203 and 207 (channels 12 and 13), in an alternate embodiment of the present invention, 25 channels are reserved instead of 24, with one channel (channel 13) being utilized as a guard channel. Table 2 illustrates a frequency reuse plan for a system having four channels per cell and six cells per cluster and one guard channel.

TABLE 2

Frequency reuse plan for a Communication System Having Four Channels Per Cell and Six Cells Per Cluster with a Guard Channel.

| Base Site | |
|---|---|
| 201 | Channels 1, 4, 7, 10 |
| 205 | Channels 2, 5, 8, 11 |
| 207 | Channels 14, 17, 20, 23 |
| 211 | Channels 15, 18, 21, 24 |
| 203 | Channels 3, 6, 9, 12 |
| 209 | Channels 16, 19, 22, 25 |

Figure 3:
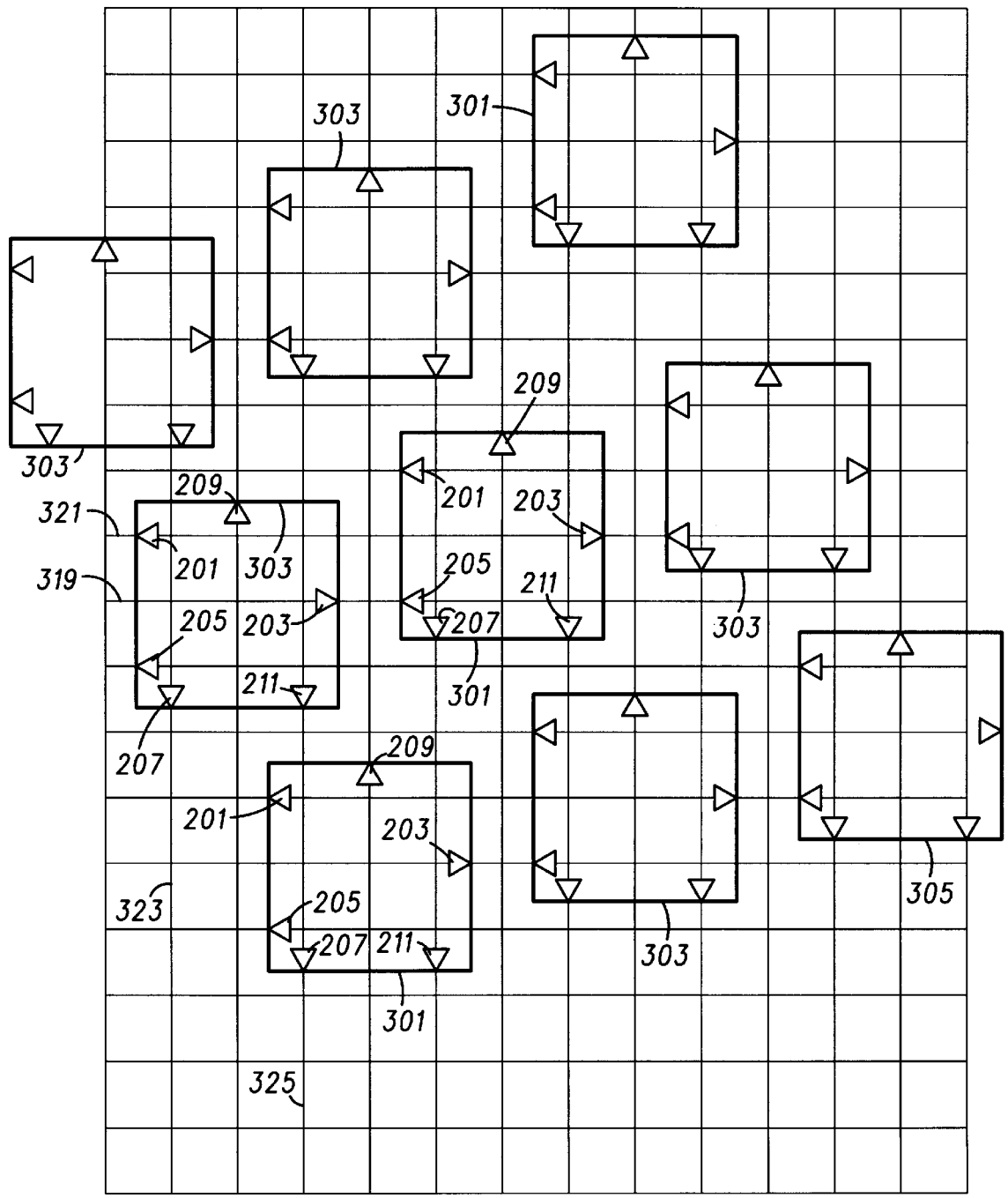
FIG. 3 illustrates a method of positioning multiple base site antenna clusters in accordance with an alternate embodiment of the present invention.

FIG. 3 illustrates a method of positioning multiple antenna clusters 301–305 in accordance with an alternate embodiment of the present invention. In one alternate embodiment of the present invention, multiple microcell clusters 301–305 are staggered in both the X and Y direction from each other. That is to say, corresponding base site antennas 201–211 of adjacent clusters 301–305 are not on the same street. This can be seen in FIG. 3, where base site antenna 205 in cluster 305 on street 319 is shifted in the Y direction from base site antenna 205 in cluster 301 on street 321. Additionally, base site antenna 207 in cluster 305 on street 323 is shifted in the X direction from base site antenna 207 in cluster 301 on street 325. Staggering antenna clusters 301–305 that are utilizing the canyon effect, serves to reduce cochannel and adjacent channel interference by placing the largest distance between base site antennas 201–211 operating on the same frequencies, while assuring continuous coverage.

In addition to staggering multiple microcell base site antennas 201–211, a three cluster frequency reuse plan is also utilized for clusters 301–305 that further isolates base site antennas 201–211 from each other, as well as from any larger macrocellular base site. As shown in FIG. 3, individual groups of frequencies are reused every third cluster 301–305. Additionally, a subset of the macrocell spectrum is reserved for base site antennas 201–211. In order to further reduce cochannel and adjacent channel interference, macrocells that are geographic neighbors to base site antennas 201–211 are not allowed to use channels reserved for base site antennas 201–211. In order to avoid interference between base site antennas 201–211 at street intersections, the frequency reuse plan is arranged such that the channels for base site antennas 207–211 propagating in the Y/–Y direction are at one end of the microcell spectrum, and the channels for base site antennas 201–205 propagating in the X/–X direction are at the other end of the microcell spectrum. The number of channels to be reserved in such a system can be determined by the following equation:

Number of channels=Number of Cells Per Cluster*Number of Clusters in reuse pattern*Number of Channels Per Cell.

Table 3 illustrates a frequency reuse plan for a system having four channels per cell, six cells per cluster, and a three cluster frequency reuse pattern.

TABLE 3

Frequency reuse plan for a Communication System Having Four Channels Per Cell, Six Cells Per Cluster, and a Three Cluster frequency reuse Pattern.

| Base Site Antenna | Cluster 301 | Cluster 305 | Cluster 303 |
|---|---|---|---|
| 201 | Channels 7, 16, 25, 34 | Channels 8, 17, 26, 35 | Channels 9, 18, 27, 36 |
| 205 | Channels 1, 10, 19, 28 | Channels 2, 11, 20, 29 | Channels 3, 12, 21, 30 |
| 207 | Channels 37, 46, 55, 64 | Channels 38, 47, 56, 65 | Channels 39, 48, 57, 66 |
| 211 | Channels 43, 52, 61, 70 | Channels 44, 53, 62, 71 | Channels 45, 54, 63, 72 |
| 203 | Channels 4, 13, 22, 31 | Channels 5, 14, 23, 32 | Channels 6, 15, 24, 33 |
| 209 | Channels 40, 49, 58, 67 | Channels 41, 50, 59, 68 | Channels 42, 51, 60, 69 |

EXAMPLES

The following example serves to illustrate the antenna arrangement in accordance with the invention, and is not intended in any way to limit the scope of this invention. This example was derived from computer simulations made with the use of a Handsim full motion simulation computer analysis program supplied by Motorola Inc. located at 1301 East Algonquin Road, Schaumburg, Ill. 60193. Handsim simulate cellular phone systems, including changing propagation characteristics caused by remote units moving through the communication system. The program allowed different system configurations to be analyzed by replacing numeric factors such as propagation pathloss, traffic distribution, handover margins, and traffic denisty.

A comparison was performed between the current macrocellular system existing in Kyoto Japan, with and without a preferred embodiment of the present invention. The purpose of the comparison was to determine any improvement in the communication system with the addition of a preferred embodiment of the present invention. The results of the comparison are shown in Table 4. Cells 42–47 are microcell clusters added to the current macrocellular system (cells 0, 10, 37, and 39). Cell 38 had frequencies removed (as discussed in reference to FIG. 3) for microcell utilization. As can be seen in Table 4, the erlangs generated by cells 0, 10, 37, and 39, as a group, are approximately the same in both systems (45.63 versus 51.05) since the number of traffic channels for these cells is the same for both systems. (An erlang is defined as the number of utilized resource hours per resource hour; thus one utilized traffic channel hour in one hour is one erlang. For example, if a base station has 5 traffic channels available and each is utilized 24 minutes during an hour, then 5 channels×24 minutes/60 minutes=2 erlangs.) The erlangs generated in the system with microcell is slightly higher due to more calls being handed out of the area with the added traffic. Comparing the erlangs generated by cell 38 in the macrocell system with that generated by cells 38, and 42–47, as a group (17.21 versus 34.69) shows that the microcell system has a capacity of 2× the equivalent macrocell system.

TABLE 4

Comparison of a Cellular Communication System With and Without a Preferred Embodiment of the Present Invention.

| | System 1 - No microcell | | | System 2 - Microcell Cluster | | |
|---|---|---|---|---|---|---|
| Cell | Blocked Call Percentage | Blocked Handover Percentage | Erlangs | Blocked Call Percentage | Blocked Handover Percentage | Erlangs |
| 0 | 13.70 | 0.70 | 14.79 | 6.10 | 3.80 | 13.54 |
| 10 | 0.70 | 2.90 | 10.99 | 0.00 | 1.00 | 11.90 |
| 37 | 4.20 | 1.60 | 10.53 | 14.00 | 2.40 | 15.38 |
| 38 | 0.60 | 0.70 | 17.21 | 1.00 | 2.20 | 15.19 |
| 39 | 0.80 | 0.40 | 9.32 | 0.00 | 2.10 | 10.23 |
| 42 | | | | 0.00 | 2.40 | 1.22 |
| 43 | | | | 0.00 | 1.80 | 3.60 |
| 44 | | | | 0.00 | 4.20 | 1.80 |
| 45 | | | | 0.00 | 7.40 | 3.88 |
| 46 | | | | 2.00 | 1.20 | 4.25 |
| 47 | | | | 1.10 | 4.00 | 4.75 |
| Subject Area total | 2.90 | 1.10 | 62.84 | 1.50 | 2.50 | 85.74 |

The descriptions of the invention, the specific details, and the drawings mentioned above, are not meant to limit the scope of the present invention. For example, in addition to employing the present invention in metropolitan areas with a grid-like street structure, the present invention can be employed in metropolitan areas with varying street structures. It is the intent of the inventors that various modifications can be made to the present invention without varying from the spirit and scope of the invention, and it is intended that all such modifications come within the scope of the following claims.

What is claimed is:

1. A cluster of antennas deployed in an urban setting wherein each antenna within the cluster is mounted substantially mid-block and below rooftop level and existing on adjacent streets at a periphery of a city block area, each antenna further having a main bore sight pointing parallel to the street and into the cluster such that a canyoning effect is used to isolate each antenna within the cluster.

2. The cluster of claim 1 wherein each antenna in the cluster is further isolated from each other via a frequency reuse plan.

3. The cluster of claim 2 wherein antennas propagating in a first direction use frequencies at one end of a spectrum and antennas propagating in a second direction use frequencies at a second end of the spectrum.

4. The cluster of claim 1 wherein a subset of a macrocell spectrum is reserved for the cluster.

5. The cluster of claim 1 further comprising a second cluster wherein corresponding antennas from the first and the second cluster are not on the same street.

6. The cluster of claim 5 wherein the first and the second cluster are isolated from each other by a frequency reuse plan.

7. The cluster of claim 1 wherein the cluster of antennas are isolated from macrocellular base sites by reserving a subset of a macrocellular spectrum for cluster use only.

8. The cluster of claim 1 wherein the cluster of antennas comprise a plurality of directional antennas.

9. A communication system existing in an urban setting having a first and a second city block area, said communication system comprising:
   a first cluster comprising:
      a first plurality of antennas, wherein each antenna within the first cluster is mounted substantially mid-block and below rooftop level and existing on adjacent streets at a periphery of the first city block area, each antenna within the first plurality of antennas further having a main bore sight pointing parallel to the street and into the first cluster such that a canyoning effect is used to isolate each antenna within the first cluster; and
   a second cluster comprising:
      a second plurality of antennas mounted similar to the first plurality of antennas, with each antenna in the second cluster existing on an adjacent street at a periphery of the second city block area, wherein corresponding antennas from the first and the second cluster are not on the same street.

10. The communication system of claim 9 wherein each antenna in the first and second cluster is further isolated from each other via a frequency reuse plan.

11. The communication system of claim 10 wherein antennas propagating in a first direction use frequencies at one end of a spectrum and antennas propagating in a second direction use frequencies at a second end of the spectrum.

12. The communication system of claim 9 wherein a subset of a macrocell spectrum is reserved for the first and the second cluster.

13. The communication system of claim 9 wherein the first and the second cluster are isolated from each other by utilizing a frequency reuse plan.

14. The communication system of claim 9 wherein the first and second plurality of antennas are isolated from macrocellular base sites by reserving a subset of a macrocellular spectrum only for use of the first and the second cluster.

15. The communication system of claim 9 wherein the first and second plurality of antennas comprise a plurality of directional antennas.

16. A method of deploying clustered antennas in a communication system existing in an urban setting, the method comprising the step of mounting a plurality of antennas to form a cluster, wherein each antenna within the cluster is mounted substantially mid-block and below rooftop level and existing on adjacent streets at a periphery of a city block area, each antenna further having a main bore pointing parallel to a street and into the cluster such that a canyoning effect is used to isolate each antenna within the cluster.

17. The method of claim 16 further comprising the step of isolating each antenna via a frequency reuse plan wherein antennas propagating in a first direction use frequencies at one end of a spectrum and antennas propagating in a second direction use frequencies at a second end of the spectrum.

18. The method of claim 16 further comprising the step of reserving a subset of a macrocell spectrum for use of the cluster.

19. An antenna arrangement in a wireless communication system wherein an antenna is mounted substantially mid-block and below rooftop level and exists on adjacent streets at a periphery of a city block area, the antenna further having a main bore pointing parallel to the street such that a canyoning effect is used to isolate the antenna from other antennas.

20. The antenna arrangement of claim 19 wherein the antenna is further isolated from other antennas via a frequency reuse plan.

21. The cluster of claim 19 wherein a subset of a macrocell spectrum is reserved for the antenna.

* * * * *